United States Patent [19]
Brunson, IV et al.

[11] Patent Number: 5,559,289
[45] Date of Patent: Sep. 24, 1996

[54] INTEGRAL WATER FLOW METER AND BACKFLOW PREVENTION ASSEMBLY

[75] Inventors: Charles P. Brunson, IV, Macon, France; Thierry W. Swinson, Wetumpka, Ala.

[73] Assignee: Schlumberger Industries, Inc., Norcross, Ga.

[21] Appl. No.: 252,859

[22] Filed: Jun. 2, 1994

[51] Int. Cl.$^6$ .................................................. G01F 15/18
[52] U.S. Cl. .................................................. 73/275; 137/512
[58] Field of Search ........................ 73/275, 276, 224; 137/512, 613

[56] References Cited

U.S. PATENT DOCUMENTS

| | | | |
|---|---|---|---|
| 1,247,583 | 11/1917 | Semple | 73/276 |
| 2,586,942 | 2/1952 | Grove | 137/512 |
| 4,614,113 | 9/1986 | Daghe et al. | 137/512 |
| 4,691,727 | 9/1987 | Zorb et al. | 137/15 |
| 4,967,788 | 11/1990 | Miller | 411/428 |
| 5,226,441 | 7/1993 | Dunmire et al. | 137/512 |

*Primary Examiner*—Richard Chilcot
*Assistant Examiner*—Harshad Patel
*Attorney, Agent, or Firm*—Lowe, Price, LeBlanc & Becker

[57] ABSTRACT

A water meter and backflow preventer for use in a water supply system having a meter box includes a housing having water infeed and outfeed openings which are connected to supply water from a main utility pipeline to a water customer domestic system through a pair of infeed and outfeed shut-off valves and a water meter mounted within the housing. A double check valve is installed in the water circuit in the housing to enable use of the double check method of backflow prevention. Test ports are provided through the housing to enable the housing unit to be testable for leaks through the valves. The water meter and backflow preventer combines backflow prevention integrated with an AWWA-approved water meter in one product having the same overall lay length as a current water meter to eliminate the need for re-fitting pipe or using adapters within the meter box.

24 Claims, 4 Drawing Sheets

5,559,289

INTEGRAL WATER FLOW METER AND BACKFLOW PREVENTION ASSEMBLY

TECHNICAL FIELD

The present invention relates generally to water meters for measuring the flow of water from a main utility pipeline to a water consumer domestic system and, more particularly, to backflow prevention of water in residential applications.

BACKGROUND ART

Municipal localities generally require that water companies protect their municipal water supply by addressing the need for backflow prevention in which water flows in a reverse direction from domestic piping systems back into the main utility pipeline. Current methods and equipment for providing this protection require the installation of a backflow preventer device at the water consumer service entrance, typically adjacent the water flow meter and usually installed in a meter box disposed in the ground outside a residential or other type of dwelling.

The known use of separate backflow preventer devices often requires extensive pipe retrofitting or the use of adapters. Since these meter boxes are typically sized for snug fit of a water flow meter therein, installation of a separate backflow preventer has often necessitated costly excavation, by heavy equipment, in order to make the necessary modifications to piping.

DISCLOSURE OF THE INVENTION

It is accordingly one object of the present invention to provide backflow prevention in conjunction with water metering while eliminating the need to incorporate an additional backflow preventer device in a water circuit between a main utility pipeline and a water consumer domestic system.

Another object is to provide a backflow preventer integrated with a water meter in a single approved unit which may easily replace an existing water meter.

Still another object is to provide a combined backflow preventer/water meter unit having the same overall lay length as the current meter installation it is replacing to eliminate the need for re-fitting pipe or using adapters.

Still another object is to provide a combined unit having a product housing which is easily testable to locate leaks through the preventer.

Still another object is to provide a combined unit into which a water meter of known construction may be easily installed prior to retrofitting replacement of a individual water meter unit.

A water meter and backflow preventer, in accordance with the invention, comprises a housing including a water infeed fitting connectable to a main utility pipeline and a water outfeed fitting connectable to a customer domestic water system. A water meter is mounted within the housing. A normally closed first check valve is also mounted within the housing. The first check valve opens when the flow of water through the water infeed fitting is above a predetermined threshold value to permit water to flow into the meter. The first check valve closes if the flow of water diminishes below the threshold value or reverses its direction to prevent a backflow condition. A normally closed second check valve is also mounted within the housing and opens when the flow of water through the infeed fitting is above the predetermined threshold value to permit water to flow into the water outfeed fitting. The second check valve closes if the water flow diminishes below the threshold value or reverses its direction to prevent a backflow condition.

A water meter and backflow preventer unit, in accordance with a preferred embodiment of the present invention, comprises a housing including a water infeed fitting connectable to a main utility pipeline and a water outfeed fitting connectable to a customer domestic water system. A water meter is mounted within the housing and an infeed shut-off valve is mounted within the housing between the infeed fitting and the water meter. A normally closed first check valve is mounted within the housing between the infeed shut-off valve and the water meter. The first check valve is operable to open when the flow of water through the infeed shut-off is above a predetermined threshold value to admit water into the meter. The first check valve closes if the flow of water either diminishes below the threshold value or reverses its direction to prevent a backflow condition. An outfeed shut-off valve is mounted within the housing between the water outfeed and the water meter. A normally closed second check valve is mounted within the housing between the water meter and the water outfeed fitting. The second check valve opens when the flow of water through the infeed shut-off valve is above the predetermined threshold value to admit water into the water outfeed fitting after it has flowed through the water meter. The second check valve closes if the flow of water either diminishes below the threshold value or reverses its direction to prevent a backflow condition.

A plurality of test ports are preferably formed in the housing in respective fluid communication upstream and downstream from each of the first and second check valves to test for leakage through these valves. These test ports allow control volumes immediately upstream and downstream from the first and second check valves to be isolated from each other as well as from the rest of the line to enable testing for pressure drop across the valves in a known manner.

The unit of the preferred embodiment advantageously combines a backflow preventer which is integrated with a water meter into one product. This product preferably has the same overall lay length as an already installed water meter it is intended to replace, thereby eliminating the need for re-fitting pipe or using adapters.

The housing is preferably a main case formed with a valve housing portion containing all of the shut-off and check valves and a water meter housing portion containing the water meter. The valve housing portion and the meter housing portion may be of integral and unitary construction with each other, such as in the form of a machined metal casting.

More specifically, the valve housing portion is of generally cylindrical construction extending along a common longitudinal axis. A transversely extending partition wall within the valve housing portion subdivides it into a water inflow cavity and a water outflow cavity. The infeed shut-off valve and the first check valve are located within the inflow cavity, upstream from the water meter, and the outfeed shut-off valve and the second check valve are located in the water outflow cavity downstream from the water meter.

In this preferred embodiment, the infeed and outfeed fittings are spaced from each other a predetermined distance which may be about equal to a standard meter lay length. In one known water meter construction (e.g., Neptune Meter Model T-10) formed without an integral backflow preventer, such a standard meter lay length is approximately 7 ½ inches in the United States. However, it will be understood that these dimensional units can be different in other countries employing different standards of measurement (e.g., metric system). As used in this specification, "standard meter lay length" is intended to mean the spatial distance between infeed and outfeed piping connectors to which infeed and outfeed fittings of an individual water meter installation are respectively connected between to measure the flow of water from a utility pipeline into a customer water system.

The infeed and outfeed fittings preferably lie on an axis which is parallel to and laterally spaced from the longitudinal axis of the valve housing. Opposite ends of the valve housing are respectively laterally adjacent the infeed and outfeed fittings. The water meter housing portion is formed between the infeed and outfeed fittings so as to define a compact product unit which may easily fit within an existing meter box.

The water meter housing portion may be of generally cylindrical cross-section in plan view and has a longitudinal axis which is perpendicular to and spaced laterally from the longitudinal axis of the valve housing portion. The water meter housing portion is preferably open at one end thereof for ease of installation and removal of a water meter therein. A circular cover plate sealingly closes the open end after the water meter has been installed. The depth or height of the water meter housing portion, as measured along its longitudinal axis, is about equal to the diameter of the valve housing portion so that it tends not to project upwardly from the valve housing when viewed in end or side profile.

Preferably, each of the infeed and outfeed shut-off valve assemblies respectively includes a valve stem rotatably secured to an end plate mounted at opposite ends of the valve housing, and a shut-off knob mounted to each valve stem outside of the valve housing. A valve body is mounted to the valve stem within the valve housing. A universal housing portion is stationarily mounted within the housing and includes a valve seat which is sealingly engaged by the axially movable valve body to shut off water flow when the shut-off knob rotates the valve stem to axially advance the valve body into the closed position.

Each of the first and second check valve assemblies preferably includes a valve seat stationarily mounted within the housing. A valve body containing a valve seat gasket is movably mounted within the housing. A spring also mounted within the housing normally biases the check valve body into the closed position for preventing flow of water in the reverse flow direction towards the water infeed fitting when the flow of water diminishes below the threshold valve or reverses its direction.

In accordance with another preferred feature of this invention, selected ones of the test ports formed in the housing are maintained in respective fluid communication with upstream and downstream locations of the first and second check valves through a pair of test port hoops. These test port hoops serve the additional function of locating the valve seats of each of the first and second check valves as well as the shut-off valve assemblies in proper axially fixed positions within the valve housing.

A method of preventing backflow between a water consumer domestic system and a main utility pipeline, in accordance with this invention, comprises the steps of circulating water from the utility pipeline to the domestic system through a flow path extending between an inlet and an outlet of a housing containing a water meter and at least two check valves. Backflow in a reverse direction of the flow path is prevented by disrupting reverse flow within the housing with the check valve in response to a pressure drop of water circulating in the flow path below a predetermined level.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
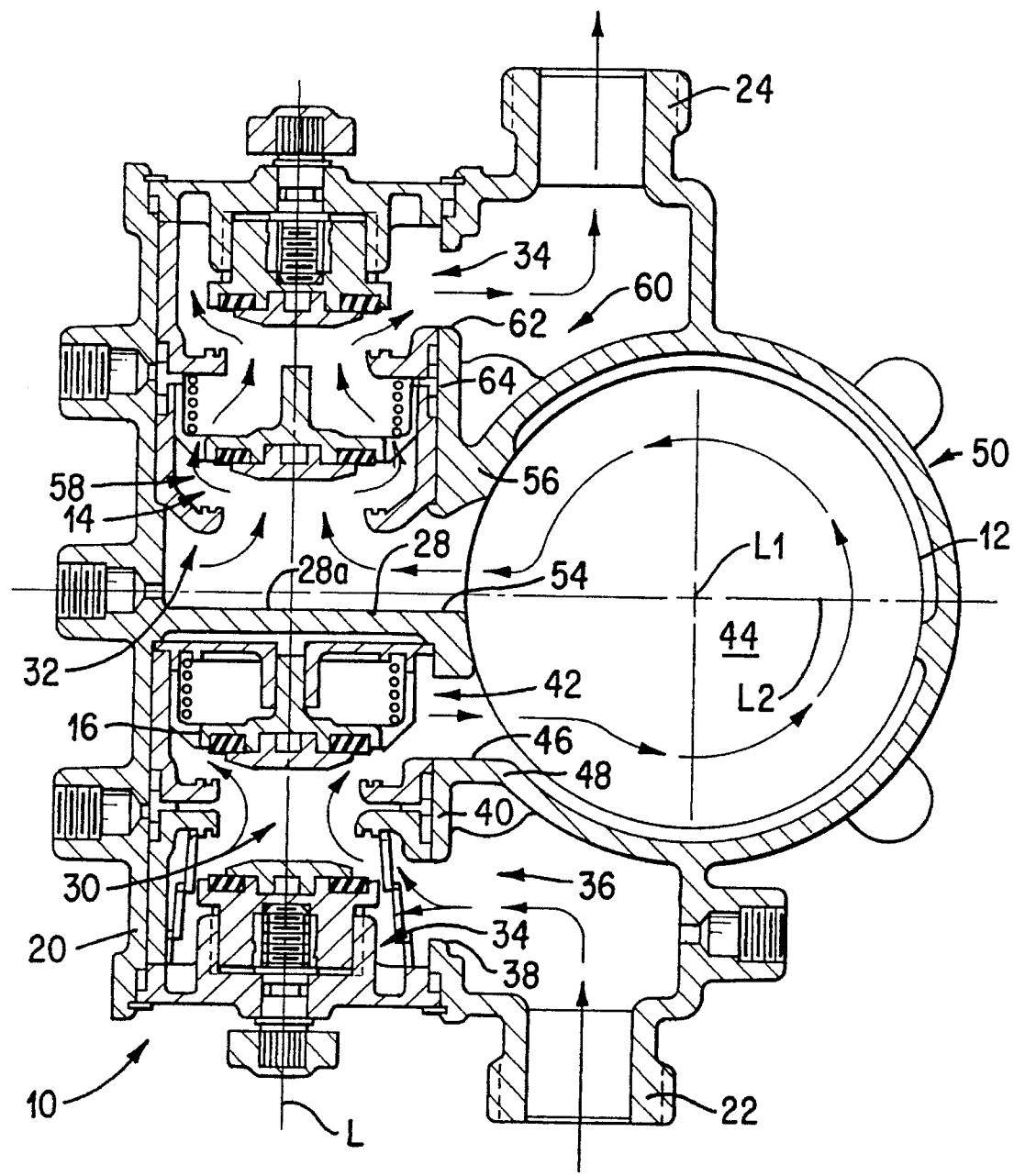
FIG. 1 is a sectional view of an integral water flow meter and backflow prevention unit in accordance with a preferred embodiment of the present invention, wherein all valves are open to depict the flow circuit through the unit.

FIG. 1 is an illustration of a water flow meter/backflow preventer assembly 10 which uniquely incorporates a positive displacement water flow meter 12 (e.g., a Neptune Meter Model T-10) with a double check valve backflow prevention assembly 14 and 16 contained within a common housing body or main case 20. The housing 20 includes an infeed connection or fitting 22 for receiving water flow inlet piping (not shown) connected to a water supply line of a main utility pipeline, and an outfeed connection or fitting 24 adapted to be connected to outlet piping (also not shown) which directs water from the main utility pipeline into a customer water system (e.g., residential or domestic). The infeed and outfeed 22 and 24 are spaced from each other by a distance which is substantially equal to the same lay length of a conventional residential water meter as previously installed without a backflow preventer to allow for ease of retrofitting installation within the existing meter box. Of course, assembly 10 is also contemplated for use in new installations.

Figure 2:
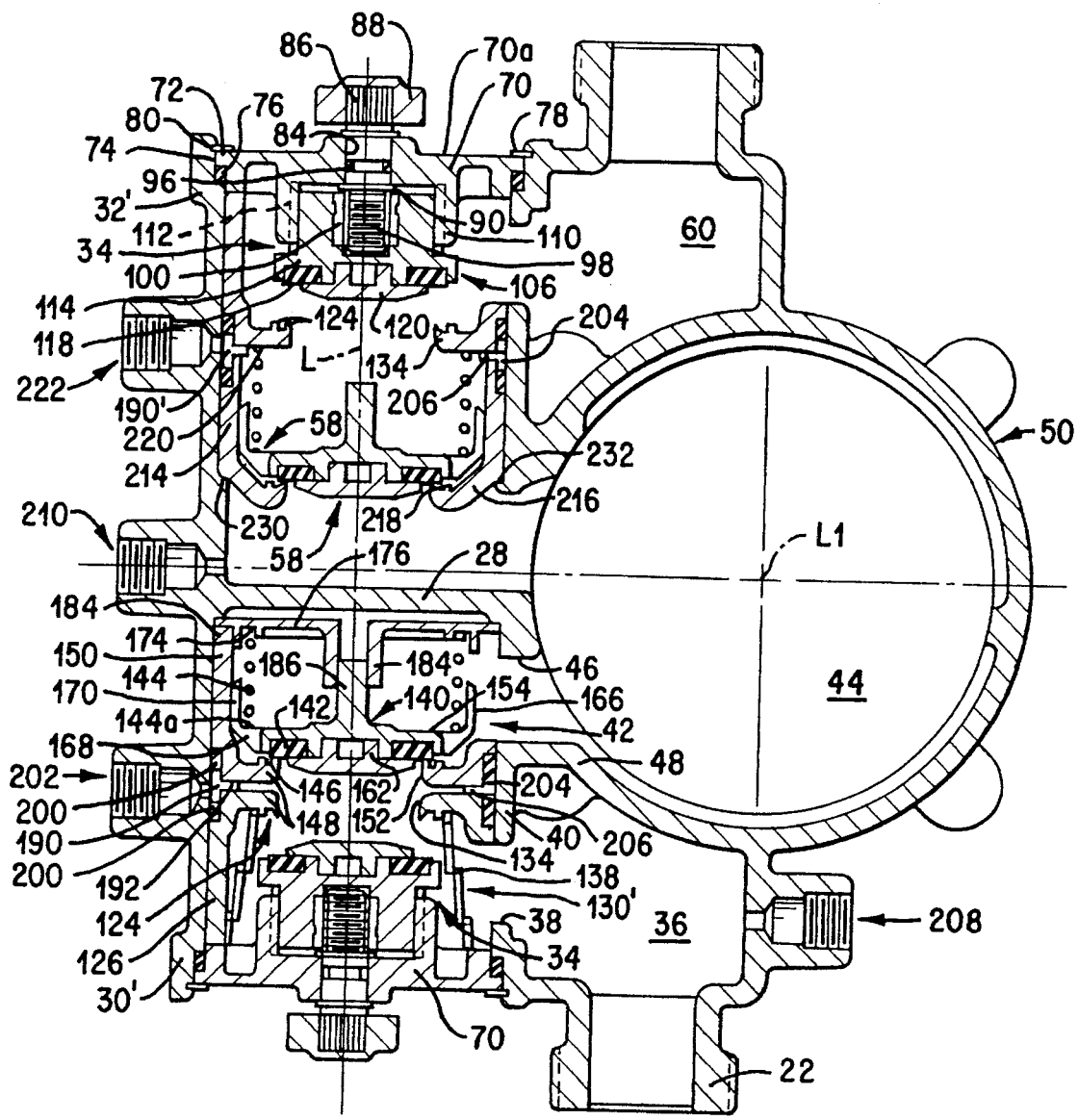
FIG. 2 is an enlarged sectional view similar to FIG. 1, wherein the double check valves within the unit are closed to prevent backflow.
Figure 3:
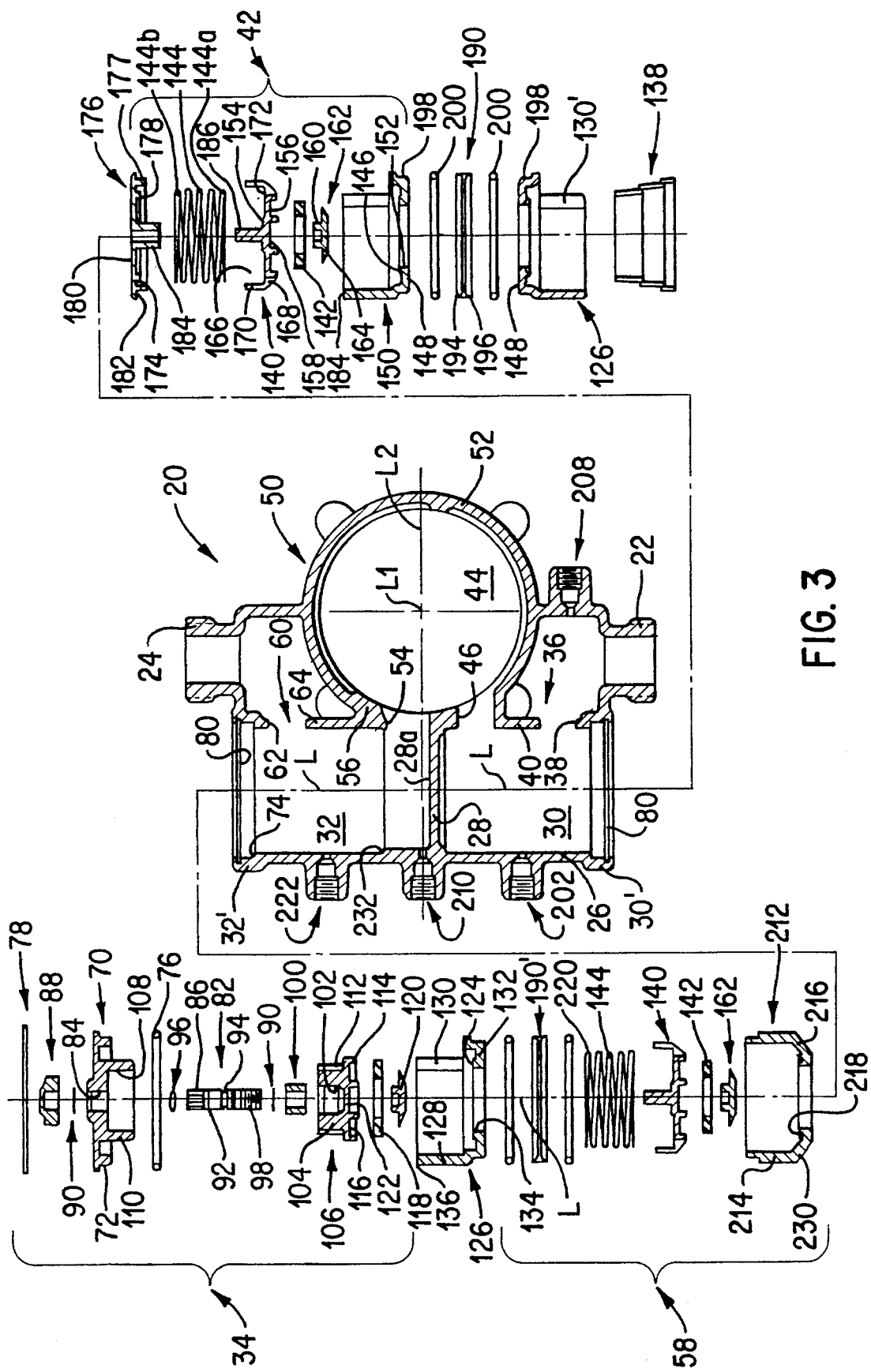
FIG. 3 is an exploded perspective view of the main case housing and valve components of the integral unit according to the present invention.
Figure 4:
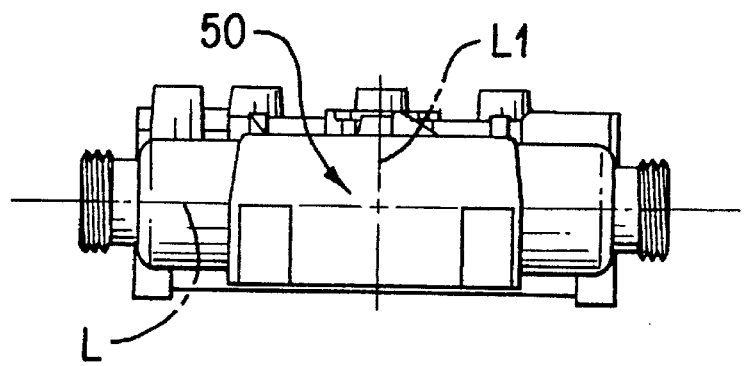
FIG. 4 is a side elevational view of one of the lengthwise extending ends of the unit of the invention when viewed from the right in FIG. 1.
Figure 5:
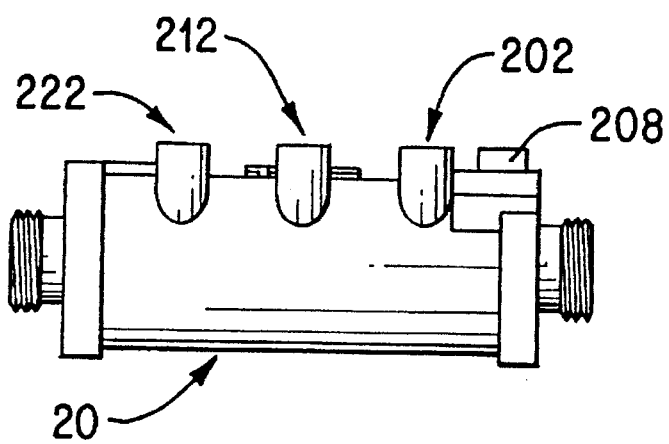
FIG. 5 is a end plan view of one of the lengthwise sides when viewed from the left in FIG. 1.
Figure 6:
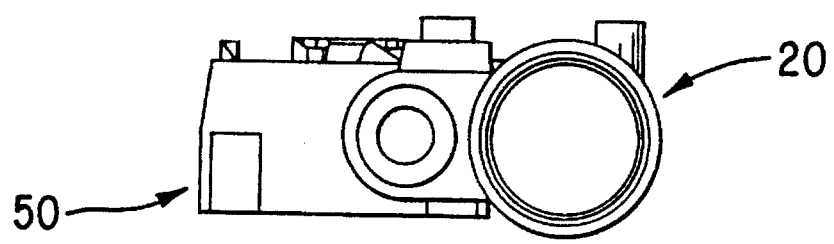
FIG. 6 is an end elevational view of the invention when viewed from a shorter widthwise side defining the outlet side of the unit.

FIG. 3 is an exploded perspective view of the water meter/backflow preventer 10 of this invention. The assembly comprises the main case 20 which is preferably manufactured as a machined casting so as to be of integral and unitary construction. The main case 20 comprises a valve housing portion 26 of generally cylindrical construction extending along a longitudinal axis L. The valve housing 26 is sub-divided with a transversely extending circular partition wall 28 into a pair of inflow and outflow cavities generally designated with reference numerals 30 and 32, respectively. Each cavity 30,32 is open at its end 30' and 32' opposite partition wall 28 so as to receive a shut-off valve assembly of identical construction, generally designated with reference numeral 34, only one of which is depicted in the upper left-hand corner of FIG. 3. The infeed shut-off valve assembly 34 in the water inflow cavity 30, in the open position of FIG. 1, receives water from the infeed fitting 22 through a sub-cavity 36 located laterally adjacent the inflow cavity 30 and in constant open communication therewith through an opening 38 formed in an interior wall 40 between the cavities 30,36. Water flowing through the open infeed shut-off valve assembly 34 exerts an opening force against a normally closed first or infeed check valve 42 (FIG. 2), located between the infeed shut-off valve and partition wall 28, which opens (FIG. 1) against a predetermined spring bias to allow water to enter the measuring chamber 44 containing the water meter 12 through an opening 46 formed between partition wall 28 and a cylindrical wall section 48 of a cylindrical housing portion 50 containing the water meter 12. This cylindrical housing portion 50 has a longitudinal axis L1 (see also FIG. 4) which is laterally spaced from and perpendicular to the valve cylindrical housing 20. As best depicted in FIGS. 4–6, the height of this cylindrical water meter housing 50 (as measured along axis L1) is about equal to the diameter of the valve cylindrical housing 20. This housing 50 is further configured in a compact manner such that only a semi-spherical portion 52 of it projects from the unit 10 (when seen in top or bottom plan view) along a lateral axis L2 which is perpendicular and co-planar to the longitudinal axis L of the cylindrical valve housing portion 20.

The water flowing out of the measuring chamber 44 flows into the outflow cavity 32 through an opening 54 formed between an outflow side 28a of the partition wall 28 and an inwardly extending arcuate wall 56 of the water meter cylindrical housing 50. The water then opens a second check valve 58 against predetermined spring bias, whereupon the water flows through the outlet fitting 24 into the customer domestic water system by flowing through the open outfeed shut-off valve 34 and then through a sub-cavity 60 located laterally adjacent the outflow cavity 32 through an opening 62 formed in an interior wall 64 between the cavities.

As best depicted in FIGS. 2 and 3, each infeed and outfeed shut-off valve assembly 34 comprises an end plate 70 formed with an annular step 72 along its periphery which is received against a shoulder 74 of corresponding diameter respectively formed in the open ends 30', 32' of cavities 30,32. An O-ring seal 76 is disposed therebetween to prevent water leakage. The end plate 70 is securely retained in the opening 30' 32' with a split retaining ring 78 received in an annular retaining groove 80 in the open end for abutting engagement with an outer surface 70a of the end plate. A valve stem 82 projects outwardly from each cavity 30,32 through a central opening 84 formed in the end plate 70 to present an outwardly projecting end provided with axial serrations 86 to which a shut-off knob 88 is mounted to rotate the stem 82 about its axis while it is maintained in axially stationary location by means of split retaining rings 90 respectively received in annular grooves 92 on the stem to bear against inner and outer surfaces of the end plate. A third annular groove 94 located between the split ring annular retaining grooves 92 is disposed within the circular opening 84 of end plate 70 to receive an O-ring seal 96 preventing leakage of water along the valve stem 82.

The valve stem 82 further includes an inner end 98 coincident with longitudinal axis L which is threaded to engage a brass or metal insert 100 press-fitted within a blind bore 102 formed in a cylindrical portion 104 of a valve body 106 facing the end plate 70. This portion 104 of valve body 106 is slidably received within a cylindrical recess 108 formed between an inner surface of the end plate 70 and a cylindrical wall 110 projecting inwardly from the inner surface towards the partition wall 28. Valve body portion 104 is movable within the cylindrical recess 108 along longitudinal axis L of the valve housing portion 26 but is secured against rotation within the recess as a result of a tongue and groove arrangement 112 between the cylindrical portion 104 of the valve body 106 and the cylindrical wall 110 of the end plate defining the recess 108. Consequently, rotation of the axially fixed shut-off valve stem 82 is operable to displace the valve body 106 along the longitudinal axis L depending on the rotational direction of knob 88.

The valve body 106 is further formed with a larger diameter end portion 114 having an annular surface facing towards the partition wall 28. This annular surface contains an annular groove 116 of rectangular cross-section which also faces inwardly in the direction of the partition wall. A valve seat gasket 118 is located in this annular groove 116 and secured therein with a retainer button 120 received in a central depression 122 located radially inside of the annular surface. This valve seat gasket 118 is axially advanced via rotation of the shut-off valve into and out of contact with a valve seat 124 controlling the flow of water into and out of each valve 34.

The valve seat 124 is defined by a universal housing 126 having a cylindrical locator wall 128 formed with a cut-out 130 subtending an arcuate interval of approximately 90° and an annular bottom wall 132 formed with a circular opening 134 therewithin. The outer diameter of the locator wall 128 corresponds to the inner diameter of the valve cylindrical housing 26. The distal end 136 of this wall 128 abuts against the end plate 70 in radially outward spaced relation to the cylindrical wall 110 in the end plate. The cut-out 130 is radially aligned with the associated inflow or outflow sub-cavity 36 or 60. The radially inwardmost portion of the annular bottom wall 132 facing towards the valve body 106 defines the valve seat 124 and is axially spaced from the end plate 70 a predetermined distance so that it sealingly contacts the valve seat gasket 118 when the shut-off knob 88 is rotated to axially advance the valve body towards the valve seat. This closes off the central flow opening 134 formed in the valve seat 124 to prevent water from flowing into the consumer domestic water system through the outfeed fitting 24.

The above described shut-off valve assembly 34 is located at both the infeed and outfeed ends of the valve housing 26. The infeed and outfeed valve assemblies 34 are therefore preferably of identical construction, with the exception that the infeed valve assembly preferably includes a strainer 138 of frusto-conical shape which is housed within the infeed universal housing 126 to extend concentrically around the valve body 106 and the valve seat 124 across the infeed flow cut-out opening 130 formed upstream from the valve 34 and downstream from the infeed fitting 22. This strainer element 138 advantageously prevents foreign matter in the main utility pipeline from entering the customer domestic water system.

The infeed check valve 42 in the inflow cavity 30 is located between the transverse partition wall 28 and the valve seat 134 of the inflow shut-off valve 34. The check valve 42 includes a valve element 140 formed with a valve seal gasket 142 which is spring biased with a compression spring 144 into normal sealing contact with a valve seat 146 formed in an annular wall 148 of an universal housing 150 which may be of identical construction as the universal housings 126 of the aforementioned shut-off valve assemblies 34. This annular wall 148 defines a central flow check valve opening 152 formed immediately coaxially adjacent and downstream from the infeed valve flow opening 134. Therefore, when the infeed valve 34 is open, water flows through the valve and pushes against the check valve element 140, causing it to open against the spring bias so that water may flow through the open check valve into the measuring chamber 44 containing the water meter 12. Under backflow conditions, i.e., when backflow water pressure is greater than inflow water pressure, the spring 144 is operable to close the check valve 42 by urging the check valve body 140 into sealing contact with the valve seat 146.

The valve body 140 of the infeed check valve 42 is a circular shaped disk 154 having a front surface which is circular in plan view facing towards the check valve seat 146. This front surface is formed with an annular groove 156 of rectangular cross-section which contains the valve seal gasket 142. This front surface further includes a cylindrical recess 158 formed concentrically within the annular groove 156 which is adapted to receive a smaller diameter hub portion 160 of a retainer button 162 press-fitted within the cylindrical recess so that a larger diameter portion 164 of the button contacts a radially inward portion of the valve seal gasket 142 to retain the gasket within the annular groove. The dimensions of the valve seal gasket 142 and retainer button 162, as well as the profiled groove characteristics 156,158 of the front surface, are identical to the corresponding surfaces 116,122 located in each of the inflow and outflow valve bodies 106 as well as the valve body 140 of the outflow check valve 58 as discussed infra.

The check valve body element 140 further comprises a plurality of spring retaining fingers 166 which are uniformly circumferentially spaced about the periphery of the circular disk 154. Each spring retaining finger 166 includes a radially outwardly extending portion 168, projecting from the periphery of the disk 154, which then bends through 90° to define an axially projecting finger 170 extending in the direction of the partition wall 28. The outer diameter defined between diametrically opposed fingers 170 is slightly less than the inner diameter of the cylindrical wall of the universal housing 150 so that the fingers slide smoothly thereagainst during opening/closing of the check valve 42,58 while retaining the check valve disk 154 and thereby the seal gasket 142 in a plane parallel to the valve seat 146.

The check valve body 140 of the outflow check valve 58 is of identical construction to the immediately above described inflow check valve body 140.

The compression spring 144 of the inflow check valve 42 has one end 144a which bears against a spring seat 172 defined by surfaces of the radially extending portion 168 of the fingers 166 which face towards the partition wall 28 in the downstream direction. The spring 144 is maintained in positive contact with the rear surface 172 of the check valve body 140 by the axially extending inner surfaces of the fingers 170 as best depicted in FIG. 2. The other end 144b of the spring 144 is disposed within an annular groove 174 of a spring retainer guide 176 located between the partition wall 28 and the cylindrical wall of the check valve universal housing 150. With reference to FIG. 3, this annular groove 174 is defined by a pair of radially spaced concentric walls 177 and 178 projecting from a surface of the circular disk 180 forming the guide 176 which faces towards the inflow check valve body 140. The radially outer wall 177 is in coaxial alignment with and axially spaced from the spring retaining fingers 170 of the check valve body 140. A portion of the retainer guide disk 180 projecting radially outwardly from the outer wall 177 defines an annular shoulder 182 receiving the distal edge 184 of the cylindrical wall of the check valve housing 150 for proper axial positioning against the partition wall 28.

The spring retainer guide 176 is further formed with a central hub 184 located concentrically within the annular groove 174 to receive a locating pin 186 projecting from the back surface of the circular check valve body element 140. This hub and pin arrangement 184,186 may serve as an additional means for aligning the valve seal gasket 142 with the check valve seat 146.

The universal housing 126 for the infeed shut-off valve 34 and the universal housing 150 (of identical construction) for the inflow check valve 42 are maintained in axially stationary position against the end plate 70 and partition wall 28, respectively, through a test port hoop 190 having an annular spacer section 192 projecting radially inward from an inner surface of the hoop for location between the annular bottom wall portions 148 of the respective universal housings. The outer diameter of the hoop 190 corresponds to the outer diameter of each universal housing 126,150 and axially extending portions 194 and 196 of the hoop, projecting from opposite sides of the annular spacer 192, are respectively received in an annular step 198 formed between the outer surface of the universal housing with its associated annular bottom wall portion. An O-ring 200 is disposed between each hoop portion 194,196 and the step 198 it is received in.

The test port hoop 190 lies in the same axial plane as a test port 202 formed in the valve cylindrical housing side wall 26 as best depicted in FIG. 2. A plug (not shown) is ordinarily fitted within the test port fitting 202 since this fitting is in fluid communication with the upstream end of the inflow check valve 42 and the downstream end of the inflow shut-off valve 34 through a series of circumferentially spaced slots 204 formed in alternating locations in each of the hoop portions 194,196 projecting axially from opposite sides of the annular spacer 192. These axial through slots 204 extend the entire height of each axially extending hoop wall portion 194,196 to intersect a slot 206 formed in the annular spacer 192. Thus, the aforesaid fluid communication occurs through that portion of the slot 206 in the spacer section 192 which is located below the universal housing portion 148 seated thereagainst. Representative ones of these slots are depicted only in the test port hoops 190 of FIG. 2.

A second test port 208 is located in the housing wall defining the inflow sub-chamber 36 upstream from the inflow shut-off valve 34 to test for pressure drop across this valve in cooperation with the test port 202 located immediately downstream from the infeed shut-off valve. This downstream test port 202 in turn cooperates with a third test port 210 located in the valve cylindrical housing wall 26 in the outflow cavity 32 at a position immediately upstream from the outflow check valve 58 to test for pressure drop across the inflow check valve 42.

The outflow check valve 58 is of substantially similar construction to the inflow check valve 42 in that it also comprises a check valve body 140 of identical construction to the inflow check valve body described in detail above. However, in the outflow check valve 58, the universal housing 212 is formed with a continuous circular side wall 214 provided with a radially inwardly and axially forwardly extending inclined annular wall 216 defining a valve seat 218 facing away from the partition wall 28 and towards the outflow valve body element 140. The gasket 142 of the valve body element 140 is normally biased with the compression spring 144 into sealing contact with the valve seat 218. The opposite end 220 of the compression spring 144 extending towards the outflow shut-off valve 34 is adapted to contact a lower surface of the radially inwardly extending annular portion 132 of the outflow valve universal housing 126 as best depicted in FIG. 2. A test port hoop 190' of identical construction to the test port hoop 190 in the inflow cavity 30 performs the dual function of providing fluid communication between a fourth test port fitting 222 formed in the cylindrical valve housing wall 26 with the downstream location of the outflow check valve 58 while axially spacing the outflow check valve housing 212 from the outflow shut-off valve housing 126. A shoulder 230 formed between the cylindrical side wall 214 of the outflow check valve housing 212 and the radially/axially extending annular bottom wall 216 thereof engages an annular lip 232 formed in the cylindrical valve housing wall 26 so that these housings 212,126 are retained in axially stationary positions.

Under normal operating conditions, the test ports 202, 208, 210 and 222 are plugged (i.e., these ports are for testing only) and the shut-off valves 34 are open. The flow of water is as depicted by arrows in FIG. 1. Therefore, water enters via the infeed 22 and exits via the outfeed 24. The momentum of the flowing water overcomes the springs 144 of the check valves 42,58, causing them to open. Water can then flow through the measuring chamber 44 and is recorded in the conventional manner. However, should flow diminish below a predetermined threshold value, or begin to reverse its direction, the check valves 42,58 will advantageously close, preventing occurrence of a backflow condition.

The assembly 10 of this invention is possessed of numerous unique features, such as the incorporation of a double check valve backflow preventer arrangement 42,58 which is integral with a positive displacement or other type of water meter 12. The feature of integral test ports 202,208,210,222 are advantageously provided for in-line testing and certification. Further, the in-line arrangement of the shut-off 34,34' and check valve 42,58 in a common valve cylindrical housing portion 26 allows for easy access to the backflow device 10 for in-line servicing. Additionally, the compact and unique manner in which the valve assemblies 34,34,42, 58 and water meter 12 are incorporated into the housing 26,50 preferably of integral and unitary construction allows for the use of a standard meter lay length for installation ease and for retrofitting.

In addition, it will now be appreciated by one of ordinary skill from review of this specification that the relative positioning of the two check valves 42 and 58 with respect to the water meter may be changed without departing from the scope of the invention. For example, the check valves 42,58 may be mounted in series with each other either upstream or downstream of the water meter.

Furthermore, the components forming the shut-off and check valves 34, 34, 42 and 58 may be made of plastic. Preferably, however, the end plate retaining rings 78, shut-off valve stems 82, compression springs 144, and the threaded inserts 100 are preferably formed of metal.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A water meter and backflow preventer adapted to be installed within a water meter box, comprising:
    (a) a housing, including a water infeed fitting connectable to a main utility pipeline and a water outfeed fitting connectable to a customer domestic water system;
    (b) a water meter mounted within said housing;
    (c) a normally closed first check valve mounted within said housing, said first check valve (1) opening when flow of water through said water infeed fitting is above a predetermined threshold value to permit water to flow into said meter, and (2) closing when said flow of water diminishes below said threshold value or reverses direction to prevent a backflow condition;
    (d) a normally closed second check valve mounted within said housing, said second check valve (1) opening when flow of water through said infeed fitting is above said predetermined threshold value to permit water to flow into said water outfeed fitting, and (2) closing when said flow of water diminishes below said threshold value or reverses its direction to prevent a backflow condition; and
    (e) wherein said housing further includes a plurality of test ports in respective communication with flow areas located upstream and downstream from each of said first and second check valves.

2. The water meter and backflow preventer of claim 1, further comprising an infeed shut-off valve mounted within said housing between said water infeed fitting and said water meter, said first check valve being mounted between said infeed shut-off valve and said water meter; an outfeed shut-off valve mounted within said housing between said water outfeed fitting and said water meter, said second check valve being mounted within said housing between said water meter and said water outfeed fitting.

3. The water meter and backflow preventer of claim 2, wherein said plurality of test ports are further formed in said housing to enable measurement of water flow on opposite sides of said infeed shut-off valve.

4. The water meter and backflow preventer of claim 2, wherein said housing is a main case formed with a (1) valve housing portion containing said shut-off valves and said check valves and a (2) water meter housing portion containing said water meter.

5. The water meter and backflow preventer of claim 4, wherein said valve housing portion and said meter housing portion are of integral and unitary construction with each other.

6. The water meter and backflow preventer of claim 4, wherein said valve housing portion is of generally cylindrical construction extending along a common longitudinal axis, and including a transversely extending partition wall sub-dividing said valve housing into a water inflow cavity and a water outflow cavity, wherein said infeed shut-off valve and said first check valve are located within said water inflow cavity and said outfeed shut-off valve and said second check valve are located in said water outflow cavity.

7. The water meter and backflow preventer of claim 6, wherein said infeed and outfeed fittings are spaced from each other a predetermined distance and wherein the length of said valve housing is less than said predetermined distance.

8. The water meter and backflow preventer of claim 7, wherein said infeed and outfeed fittings lie on an axis which is parallel to and laterally spaced from said longitudinal axis of said valve housing, wherein opposite ends of said valve housing are respectively laterally adjacent the infeed and outfeed fittings.

9. The water meter and backflow preventer of claim 7, wherein said predetermined distance is about equal to a standard meter lay length.

10. The water meter and backflow preventer of claim 9, wherein said standard meter lay length is approximately 7 ½ inches or an equivalent thereof when said water meter and backflow preventer is utilized in countries outside the United States.

11. The water meter and backflow preventer of claim 7, wherein said water meter housing portion is formed between said infeed and outfeed fittings.

12. The water meter and backflow preventer of claim 11, wherein said water meter housing portion is of generally cylindrical cross-section in plan view and has a longitudinal axis which is perpendicular and spaced laterally from said longitudinal axis of said valve housing portion.

13. The water meter and backflow preventer of claim 12, wherein said water meter housing portion is open at one end thereof for ease of installation and removal of said water meter therefrom, and further including a cover plate for closing said open end.

14. The water meter and backflow preventer of claim 13, wherein the depth or height of said water meter housing portion as measured along its longitudinal axis is about equal to the diameter of said valve housing portion.

15. The water meter and backflow preventer of claim 2, wherein said housing includes a valve housing portion and each of said infeed and outfeed shut-off valve assemblies respectively includes:

(a) a valve stem rotatably secured to an end plate formed at opposite ends of said valve housing;

(b) a shut-off knob mounted to each valve stem outside of said valve housing;

(c) a valve body mounted to said valve stem within said valve housing; and (d) a universal housing portion mounted within said valve housing and including a valve seat which is sealingly engaged by said axially movable valve body when the shut-off knob rotates the valve stem to axially advance the valve body into closed position.

16. The water meter and backflow preventer of claim 15, wherein each of said first and second check valve assemblies includes a valve seat stationarily mounted within said housing; a valve body containing a valve seal gasket movable mounted within said housing; and a spring mounted within said housing for normally biasing said valve seal gasket into a closed position for preventing flow of water in the reverse flow direction towards said water infeed fitting when said flow of water diminishes below said threshold value or reverses its direction.

17. The water meter and backflow preventer of claim 16, further comprising a pair of test port hoops for (1) providing fluid communication between selected ones of said test ports located upstream from said first check valve and downstream from said second check valve, and (2) locating said valve seats of each of said first and second check valves and said shut-off valve assemblies in a proper axial position within said valve housing.

18. The water meter and backflow preventer of claim 2, wherein each of said first and second check valve assemblies includes a valve seat stationarily mounted within said housing; a valve body containing a valve seal gasket movable mounted within said housing; and a spring mounted within said housing for normally biasing said valve seal gasket into a closed position for preventing flow of water in the reverse flow direction towards said water infeed fitting when said flow of water diminishes below said threshold value or reverses its direction.

19. The water meter and backflow preventer of claim 2, wherein said infeed valve and first check valve define a first flow path, and wherein said water meter circulates water along a second flow path which is substantially co-planar with said first flow path, and said outfeed valve and said second check valve define a third flow path which is substantially co-planar with said first and second flow paths.

20. The water meter and backflow preventer of claim 19, wherein said first and third flow paths have a common flow axis.

21. The water meter and backflow preventer of claim 20, wherein said infeed fitting and said infeed shut-off valve define a fourth flow path, and said outfeed fitting and outfeed shut-off valve define a fifth flow path, said fourth and fifth paths being co-planar with said first through third flow paths.

22. The water meter and backflow preventer of claim 21, wherein said fourth and fifth flow paths have a common flow axis.

23. A water meter and backflow preventer adapted to be installed within a water meter box, comprising:

(a) a housing, including a water infeed fitting connectable to a main utility pipeline and a water outfeed fitting connectable to a customer domestic water system;

(b) a water meter mounted within said housing;

(c) a normally closed first check valve mounted within said housing, said first check valve (1) opening when flow of water through said water infeed fitting is above a predetermined threshold value to permit water to flow into said meter, and (2) closing when said flow of water diminishes below said threshold value or reverses its direction to prevent a backflow condition;

(d) a normally closed second check valve mounted within said housing, said second check valve (1) opening when flow of water through said infeed fitting is above said predetermined threshold value to permit water to flow into said water outfeed fitting, and (2) closing when said flow of water diminishes below said threshold value or reverses its direction to prevent a backflow condition;

an infeed shut-off valve mounted within said housing between said water infeed fitting and said water meter;

an outfeed shut-off valve mounted within said housing between said water outfeed fitting and said water meter.

24. The water meter and backflow preventer of claim 23, wherein said housing further includes a plurality of test ports in respective communication with flow areas located upstream and downstream from each of said first and second check valves.

* * * * *